United States Patent
Su

(12) 
(10) Patent No.: US 10,204,731 B2
(45) Date of Patent: Feb. 12, 2019

(54) TRANSMITTING COIL STRUCTURE AND WIRELESS POWER TRANSMITTING TERMINAL USING THE SAME

(71) Applicant: NINGBO WEIE ELECTRONIC TECHNOLOGY CO., LTD., Zhenhai, Ningbo (CN)

(72) Inventor: Hengyi Su, Ningbo (CN)

(73) Assignee: Ningbo WeiE Electronic Technology Co., Ltd., Zhenhai, Ningbo (CN)

( * ) Notice: Subject to any disclaimer, the term of this patent is extended or adjusted under 35 U.S.C. 154(b) by 113 days.

(21) Appl. No.: 15/332,212

(22) Filed: Oct. 24, 2016

(65) Prior Publication Data
US 2017/0117083 A1 Apr. 27, 2017

(30) Foreign Application Priority Data
Oct. 24, 2015 (CN) .......................... 2015 1 0698458

(51) Int. Cl.
H01F 27/28 (2006.01)
H01F 38/14 (2006.01)
H02J 50/12 (2016.01)

(52) U.S. Cl.
CPC ............. *H01F 27/28* (2013.01); *H01F 38/14* (2013.01); *H02J 50/12* (2016.02)

(58) Field of Classification Search
CPC .................................. H01F 27/28; H01F 38/14
See application file for complete search history.

(56) References Cited

U.S. PATENT DOCUMENTS

| 7,091,814 | B2 * | 8/2006 | Kyriazidou | H01F 17/0013 257/E21.022 |
| 7,307,503 | B2 * | 12/2007 | Kaji | H01F 17/0006 257/E21.022 |
| 7,397,246 | B2 * | 7/2008 | Freytag | G01R 33/34069 324/318 |
| 8,081,125 | B2 * | 12/2011 | Dokai | G06K 7/10178 343/700 MS |
| 9,111,676 | B2 * | 8/2015 | Ler | H01F 17/0013 |
| 2005/0077992 | A1 * | 4/2005 | Raghavan | H01F 17/0006 336/200 |
| 2005/0116724 | A1 * | 6/2005 | Red'ko | G01N 27/023 324/649 |

(Continued)

OTHER PUBLICATIONS

Merriam-Webster, "Definition of same," pp. 1-2.*

*Primary Examiner* — Thienvu Tran
*Assistant Examiner* — Pinping Sun
(74) *Attorney, Agent, or Firm* — Charles C. Achkar; Ostrolenk Faber LLP

(57) ABSTRACT

Disclosed are a transmitting coil structure and wireless power transmitting terminal using the transmitting coil structure. The transmitting coil has a first winding and a second winding connected in parallel, so that the transmitting coil has a smaller inductance than the conventional transmitting coil in the condition of the same spatial magnetic field. When the receiving terminal is near the transmitting coil, the inductance of the transmitting coil is smaller, and the influence of the receiving terminal to the inductance of the transmitting coil is reduced significantly, and the effect to the impedance matching of the primary side transmitting coil and the resonant capacitor will not be too large, so as to improve the power transmission efficiency of the system.

6 Claims, 4 Drawing Sheets

(56) References Cited

U.S. PATENT DOCUMENTS

| | | | |
|---|---|---|---|
| 2010/0253153 A1* | 10/2010 | Kondo | H01F 27/2876 |
| | | | 307/104 |
| 2014/0265612 A1* | 9/2014 | Choi | H01F 27/2804 |
| | | | 307/104 |
| 2015/0015197 A1* | 1/2015 | Mi | B60L 11/182 |
| | | | 320/108 |
| 2015/0280448 A1* | 10/2015 | White, II | H02J 5/005 |
| | | | 307/104 |
| 2016/0164346 A1* | 6/2016 | Zhang | H02J 50/12 |
| | | | 307/104 |

* cited by examiner

TRANSMITTING COIL STRUCTURE AND WIRELESS POWER TRANSMITTING TERMINAL USING THE SAME

CROSS REFERENCE TO RELATED APPLICATIONS

The present application claims the benefit of priority of Chinese Application No. 201510698458.3, filed Oct. 24, 2015 the subject matter of which is incorporated herein by reference.

FIELD OF THE INVENTION

The present invention relates to the field of wireless charging, in particular to a transmitting coil structure and a wireless power transmitting terminal using the transmitting coil structure.

BACKGROUND OF THE INVENTION

1. Description of the Related Art

With reference to FIG. 1 for the schematic diagram of a magnetic resonance type wireless power transmission device, a transmitting terminal includes a resonant structure formed by a primary side transmitting coil Ls and a resonant capacitor Cs, wherein the primary side transmitting coil Ls includes an excitation inductance and a leakage inductance. A receiving terminal includes a resonant structure formed by a secondary side receiving coil Ld and a resonant capacitor Cd. To guarantee the effective transmission of the wireless power, the resonant frequency of the primary side and secondary side resonant structures and the operating frequency f0 are set to be the same, such as 6.78 MHZ as specified by the Alliance for Wireless Power (A4WP) standard. Now, the transmission efficiency is the highest. Wherein, T in FIG. 1 is a transformer.

The transmitting coil receives an input current for generating spatial magnetic field, and the receiving coil induces the spatial magnetic field to obtain a corresponsive alternating voltage. During the working process, if the receiving terminal is situated near the transmitting coil, the distribution of the magnetic field around the transmitting coil will be affected, so that the inductance of the primary side transmitting coil Ls has a change. For example, if the receiving terminal is situated at a different position around the transmitting coil, the inductance of the transmitting coil Ls will be different or if a plurality of receiving terminals are situated near the transmitting coil Ls, the inductance of the transmitting coil Ls will be changed. Now, the impedance of a compensation capacitor Cs and the impedance b of the transmitting coil Ls will not matched, and the power transmission efficiency of the whole system will be affected.

2. Summary of the Invention

In view of the drawback of the prior art, it is a primary objective of the present invention to provide a transmitting coil structure and wireless power transmitting terminal using the transmitting coil structure. The transmitting coil adopts two windings in parallel. Compared with the conventional one winding in series, the transmitting coil of the present invention has a much lower inductance than the conventional transmitting coil in the condition of the same spatial magnetic field. Therefore, the receiving terminal can reduce the influence to the inductance of the transmitting coil significantly, and a primary side compensation capacitor of the transmitting coil is situated at an impedance matching status to guarantee the high transmission efficiency of the whole system.

To achieve the aforementioned and other objectives, the present invention discloses a transmitting coil structure comprising a coil and a radiation plate, characterized in that the coil includes an input end, an output end, a first winding and a second winding, and the input end and the output end are two adjacent end points on the same plane; the first winding has a first end coupled to the input end, and a second end coupled to the output end, and the second winding has a first end coupled to the output end and a second end coupled to the input end; and the first winding and the second winding are wound symmetrically by using the central vertical line connected between the input end and the output end as an axis of symmetry to jointly form a N-turn coil, and N≥1.

Wherein, when the number of turns N of the coil is an odd number, the first winding and the second winding are wound symmetrically by using the central vertical line as the axis of symmetry to obtain the N-turn coil, and the first winding and the second winding pass through the position of the central vertical line.

When the number of turns N of the coil is an even number, the first winding and the second winding are wound symmetrically by using the central vertical line as the axis of symmetry to obtain the N-turn coil.

Preferably, the first winding and the second winding have the same material, thickness and length.

Preferably, the N-turn coil jointly formed by the first winding and the second winding is a symmetrical coil structure.

Preferably, the first winding and the second winding jointly form an N-turn circular coil, an N-turn square coil, or an N-turn elliptical coil.

Preferably, the coil is attached onto the radiation plate.

To achieve the aforementioned and other objectives, the present invention further discloses a wireless power transmitting terminal for transmitting power to a separated power receiving terminal, and the wireless power transmitting terminal comprises an inverter circuit, a switch control circuit and a transmission part, wherein the inverter circuit receives an external DC power, for generating high frequency alternating voltage signal; the switch control circuit is provided for controlling the switching operation of a switch component in the inverter circuit, so that the switch component in the inverter circuit is electrically conducted at zero voltage; the transmission part comprises a transmitting coil and a resonant capacitor, and the transmitting coil has the transmitting coil structure as recited in any one of claims 1 to 6, and the resonant capacitor and the transmitting coil have a resonant frequency equal to the predetermined frequency.

Preferably, the predetermined frequency is an operating frequency of the system of the power transmitting terminal and the power receiving terminal.

The transmitting coil structure and wireless power transmitting terminal using the transmitting coil structure in accordance with the present invention has a transmitting coil with a first winding and a second winding symmetrically wound in parallel to obtain the N-turn coil, so that the inductance of the transmitting coil of the invention is smaller than that of the conventional transmitting coil with the windings connected in series under the condition of the same spatial magnetic field. For example, the inductance of the transmitting coil of the present invention is reduced by 75% compared with the inductance of the conventional transmitting coil with a serial connecting structure under the condition of the same number of turns. When the receiving terminal is near the transmitting coil, the inductance of the transmitting coil is smaller, so that the influence of the receiving terminal to the inductance of the transmitting coil is reduced significantly and the impedance matching of the primary side transmitting coil and the resonant capacitor will not be affected substantially, so as to improve the power transmission efficiency of the system.

DESCRIPTION OF THE PREFERRED EMBODIMENTS

The above and other objects, features and advantages of this disclosure will become apparent from the following detailed description taken with the accompanying drawings. It is noteworthy that the embodiments are provided for the purpose of illustrating the technical characteristics and effects of the present invention, but not intended for limiting the scope of the invention.

Figure 1:
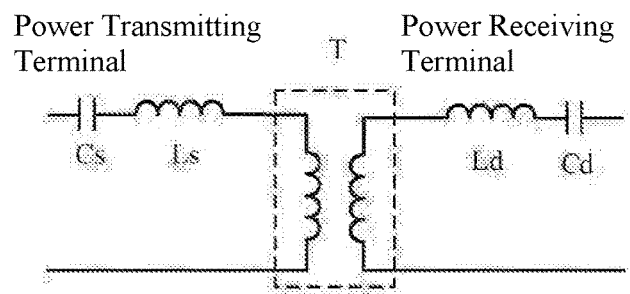
FIG. 1 is a schematic diagram of a magnetic resonance type wireless power transmission device.
Figure 2:
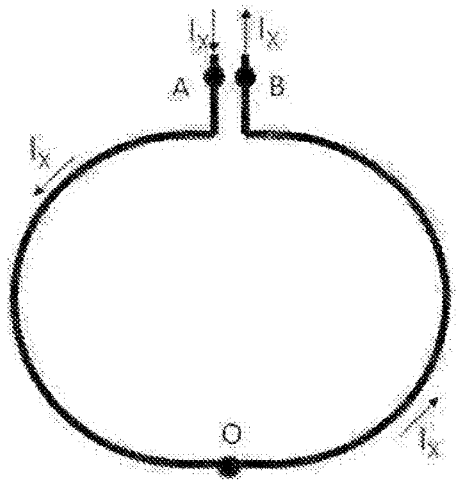
FIG. 2 is a schematic view of the structure of a one-turn coil of a conventional transmitting coil.

With reference to FIG. 2 for a conventional transmitting coil with a serial connection, a one-turn transmitting coil is used as an example for illustration. The winding of the transmitting coil is wound from an End A to an End B, and the mid-point of the winding is Point O, so that the transmitting coil may be treated that both of the winding AO and the winding OB are connected in series, and if the inductance of the winding AO is set to 0.5Ls, then the total inductance of the transmitting coil will be Ls.

Figure 3:
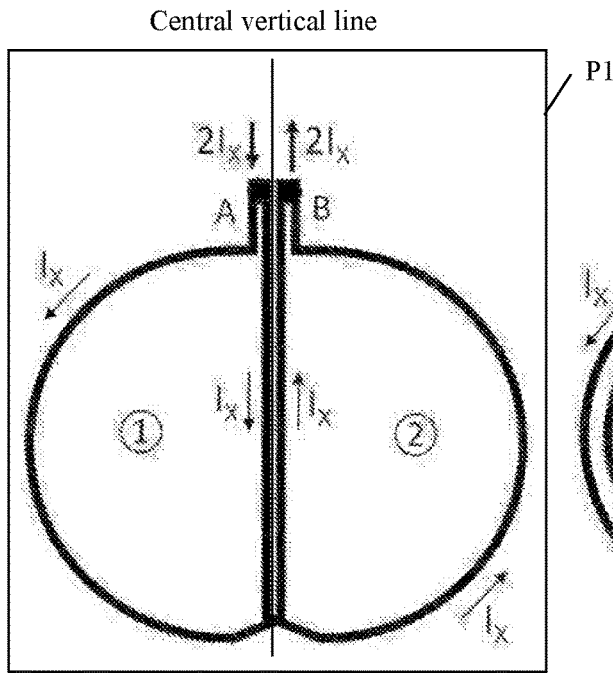
FIG. 3 is a schematic view of a transmitting coil in accordance with a first preferred embodiment of the present invention.
Figure 6A:
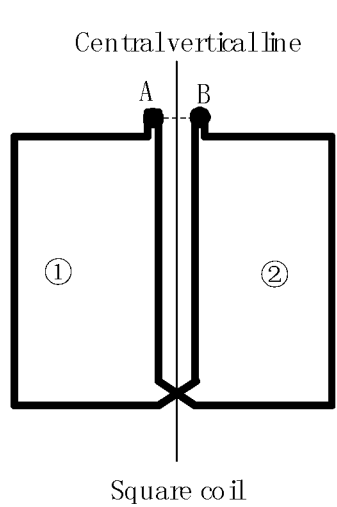
FIG. 6a shows a square coil in accordance with a preferred embodiment of the present invention.
Figure 6B:
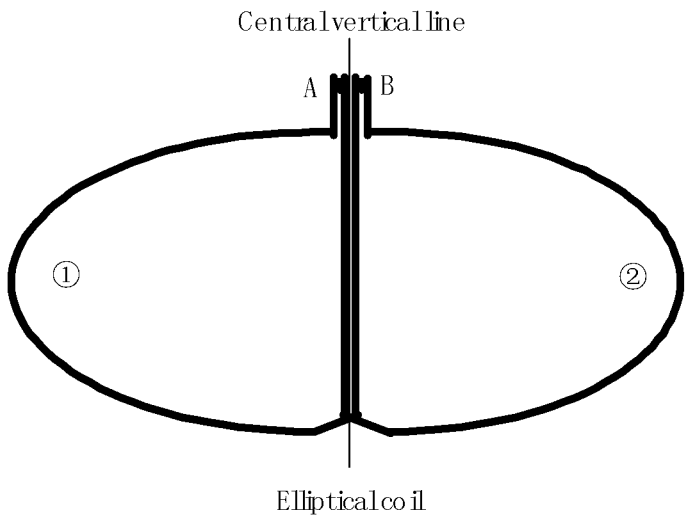
FIG. 6b shows an elliptical coil in accordance with a preferred embodiment of the present invention.

The transmitting coil structure of the present invention comprises a coil and a radiation plate, and the coil is attached onto the radiation plate P1 as shown in FIG. 3, and the coil includes an input end such as End A, an output end such as End B, a first winding ① and a second winding ②, and End A and End B are two adjacent end points on the same plane. In this preferred embodiment, the current is defined to be inputted from End A and outputted from End B, and it is easy to understand that the direction of the current flow is interchangeable. Two end points of the first winding ① and the second winding ② are coupled to End A and End B respectively to form a parallel connection structure, and the first winding ① and the second winding ② are wound symmetrically by using the central vertical line jointed between the input end and the output end as an axis of symmetry to jointly form an N-turn coil, wherein N≥1. In this preferred embodiment, a one-turn circular coil as shown in FIG. 3 is used as an example for illustration, and both first winding ① and second winding ② have the same material, thickness and length. For example, the winding length of the first winding ① and the second winding ② includes the length of a semi-circular arc and the length of the central vertical line, and the lengths where the first winding ① and the second winding ② are situated at the central vertical line are equal. Persons having ordinary skill in the art should know that the N-turn coil may be in square as shown in FIG. 6a, elliptical as shown in FIG. 6b, or any other shape with a symmetrical structure.

With reference to FIG. 3 for a schematic view of the structure of the invention, the first winding ① and the portion AO as shown in FIG. 2 have substantially the same winding length, and the material and thickness of the two are also substantially the same, and the inductance of the first winding ① is also equal to 0.5Ls. Similarly, the inductance of the second winding ② is also equal to 0.5Ls. Therefore, the total inductance of the transmitting coil of this preferred embodiment is equal to Ls/4. When currents of different magnitudes pass through the windings (such as a current of $2I_X$ is inputted from an input end $2I_X$, the currents in the first winding ① and the second winding ② are equal to $I_X$. In this preferred embodiment, the length of the first winding ① and the length of the second winding ② are equal at the positions of the central vertical line, so that the magnetic fields produced at the central vertical line are offset. In the one-turn coil of the conventional power transmitting coil, a current of $I_X$ is passed, so that the spatial magnetic field generated by this preferred embodiment is equal to the spatial magnetic field generated by the prior art. According to the foregoing calculation, the inductance of the coil of this preferred embodiment is just equal to ¼ of the present existing inductance. Compared with the prior art, the inductance of the transmitting coil structure inductance of this preferred embodiment drops 75%, so that the influence to the inductance of the transmitting coil due to external factors is reduced significantly. For example, when the power receiving terminal is placed at the same position around the transmitting coil as shown in FIGS. 2 and 3, the percentage of influence of the receiving terminal to the magnetic fields around the transmitting coil is equal, and the inductance of coil as shown in FIGS. 2 and 3 is reduced by 20%. In other words, the inductance of the coil as shown in FIG. 2 drops 0.2*Ls=Ls/5, and the inductance of the coil as shown in FIG. 3 drops 0.2*Ls/4=Ls/20. Obviously, the change of inductance of the coil of the parallelly connected coil structure is much smaller than the serially connected transmitting coil, so that the inductance of the transmitting coil of the present invention is more stable.

When the transmitting coil of the invention is applied to a wireless power transmission device, and the power transmitting terminal and the power receiving terminal are operating at a system operating frequency f0, the highest transmission efficiency is achieved. When the transmitting coil in accordance with a preferred embodiment of the present invention is operated at the frequency f0, the impedance of the transmitting coil just has a change of $2\pi f0 L_s/20$, wherein f0 is the resonant frequency of the system, and thus the level of unmatched impedance of the transmitting coil is lowered significantly, so as to maintain a relatively high transmission efficiency of the system.

Figure 4:
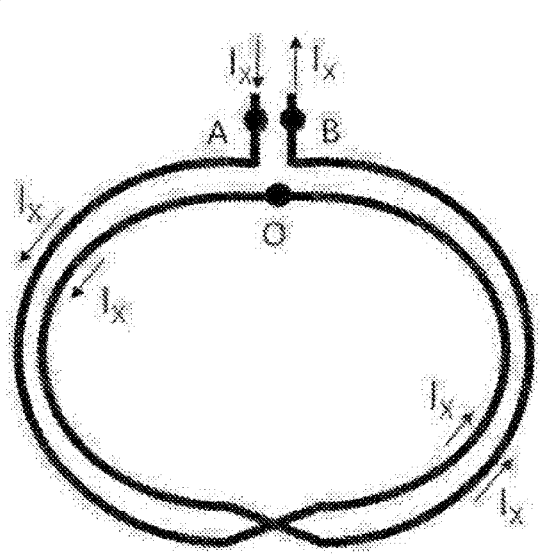
FIG. 4 is a schematic view of a two-turn coil of a conventional transmitting coil.
Figure 5:
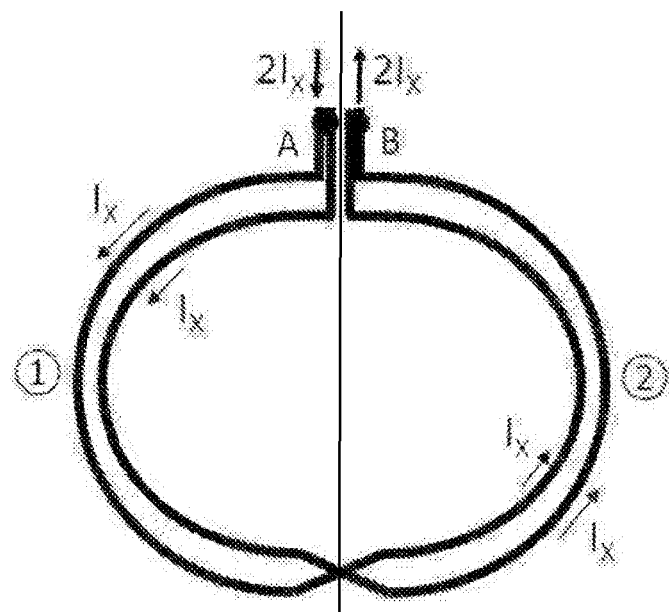
FIG. 5 is a schematic view of the structure of a transmitting coil in accordance with a second preferred embodiment of the present invention.

With reference to FIG. 4 for a schematic view of the structure of a conventional transmitting coil with a two-turn coil, a winding is generally adopted in the prior art to obtain a two-turn coil, and two end points are End A and End B respectively, and the mid-point of the winding is Point O, so that the windings can be treated as a serial connection of two windings AO and OB, and the inductance of the windings AO and OB is equal to 0.5Ls, and the total inductance of the conventional two-turn coil is equal to Ls. According to the winding method in accordance with a preferred embodiment of the present invention (refer to FIG. 5 for the structure of a transmitting coil in accordance with the second preferred embodiment of the present invention), two windings such as a first winding ① and a second winding ② as shown in FIG. 5 are connected in parallel, and the first winding ① has a first end of coupled to End A and a second end coupled to End B, and the second winding has a first end coupled to End B and a second end coupled to End A, and the first winding ① and the second winding ② are wound symmetrically with respect to the central vertical line of End B, and the first winding ① and the second winding ② jointly form a two-turn circular coil. In this preferred embodiment, the inductance of both first winding ① and second winding ② is equal to 0.5Ls, and the total inductance of the coil as shown in FIG. 5 is equal to Ls/4. When the same current passes through each winding, the transmitting coil of this preferred embodiment of the present invention generates the same spatial magnetic field as the conventional transmitting coil, but has an inductance at least 75% lower than the conventional transmitting coil, and the invention also has the advantages of stable inductance and high transmission efficiency.

Figure 7:
FIG. 7 illustrates a power transmitting terminal in accordance with a preferred embodiment of the present invention.

Finally, referring to FIG. 7, the present invention further discloses a wireless power transmitting terminal using a separated power receiving terminal to transmit power, and the wireless power transmitting terminal comprises an inverter circuit, a switch control circuit and a transmission part, and the inverter circuit receives an external DC power to generate a high frequency alternating voltage signal. The switch control circuit is provided for controlling a switching operation of a switch component in the inverter circuit, so that the switch component in the inverter circuit is electrically conducted at zero voltage. The conventional inverter circuit may be a full-bridge, half-bridge, Class E or Class D inverter circuit, and the switch control circuit may be a conventional or modified control circuit (such as the flexible switch control circuit structure as disclosed in P.R.C. Patent Application No. 201520579872.8.

The power transmitting terminal further comprises a transmitting coil and a resonant capacitor, and the transmitting coil has the aforementioned transmitting coil structure, and the resonant capacitor and the transmitting coil have a resonant frequency equal to the predetermined frequency, and the predetermined frequency is the operating frequency of the system of the power transmitting terminal and the power receiving terminal.

With the aforementioned parallel connected winding structure, the inductance of the transmitting coil of the power transmitting terminal is reduced significantly. In a working process, the influence of the power receiving terminal to the inductance of the transmitting coil is reduced significantly, so that the level of unmatched impedance of the transmitting coil and the resonant capacitor of the power transmitting terminal is lowered significantly, so as to maintain a relatively high transmission efficiency of the system.

It is noteworthy that the present invention uses the one-turn or two-turn coils in the embodiments for illustration, but persons having ordinary skill in the art should know that the present invention can be inferred to a coil with more than two turns with the same effects of reducing the inductance of the transmitting coil and providing high stability and excellent power transmission efficiency.

Persons having ordinary skill in the art may follow the above detailed description of the transmitting coil structure and wireless power transmitting terminal using the transmitting coil structure in accordance with the preferred embodiment of the present invention to deduce other similar structures and layouts for the application of the present invention. Any modification and variation applying the idea of the present invention is intended to be covered within the scope of the present invention.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system comprising a power transmitting terminal and a power receiving terminal, the system configured to wirelessly transmit power from the power transmitting terminal to the power receiving terminal, wherein the power transmitting terminal comprises:
   an inverter circuit configured to receive an external direct current power;
   a switch control circuit configured to control a switching operation of a switch component in the inverter circuit, so that the switch component in the inverter circuit is electrically conducted at zero voltage;
   a transmission part configured to generate an alternating voltage signal with a frequency higher than zero that comprises a transmitting coil structure and a resonant capacitor, wherein the transmitting coil structure comprises a coil having an input end, an output end, a first winding and a second winding, and the input end and the output end are two adjacent end points on the same plane;
   the first winding has a first end of the first winding coupled to the input end, and a second end of the first winding coupled to the output end, and the second winding has a first end of the second winding coupled to the output end and a second end of the second winding coupled to the input end;
   the first winding and the second winding are arranged symmetrically by using a central vertical line extending in between the input end and the output end as an axis of symmetry to jointly form an N-turn coil, where N is a number of turns of the coil, and N is equal to or greater than 1;
   wherein when the number of turns of the coil (N) is an odd number, the first winding and the second winding are arranged symmetrically by using the central vertical line as an axis of symmetry to obtain the N-turn coil, and the first winding and the second winding include a part with a length equal to a length of the central vertical line enclosed by an outmost winding of the coil; and when the number of turns of the coil (N) is an even number, the first winding and the second winding are arranged symmetrically by using the central vertical line as an axis of symmetry to obtain the N-turn coil;
   the resonant capacitor and the transmitting coil have a resonant frequency equal to a predetermined frequency; and
   wherein, when the power receiving terminal is near the transmitting coil, the influence of the power receiving terminal to the inductance of the transmitting coil is less than the influence to the inductance of a conventional transmitting coil with the windings connected in series under the condition of the same spatial magnetic field, and the effect to the impedance matching of the primary side transmitting coil and the resonant capacitor is therefore less than when the transmitting coil is a conventional transmitting coil with the windings connected in series under the condition of the same spatial magnetic field, so as to improve the power transmission efficiency of the system.

2. The system of claim 1, wherein the first winding and the second winding of the transmitting coil structure have the same material, thickness, and length.

3. The system of claim 1, wherein the N-turn coil jointly formed by the first winding and the second winding of the transmitting coil structure is a symmetrical coil structure.

4. The system of claim 3, wherein the first winding and the second winding of the transmitting coil structure jointly form an N-turn circular coil, an N-turn square coil, or an N-turn elliptical coil.

5. The system of claim 1, wherein the predetermined frequency is an operating frequency of the power transmitting terminal and the power receiving terminal.

6. The system of claim 1, wherein the transmitting coil structure further comprises a radiation plate.

* * * * *